US007142810B2

(12) United States Patent
Oesterling

(10) Patent No.: US 7,142,810 B2
(45) Date of Patent: Nov. 28, 2006

(54) METHOD OF COMMUNICATING WITH A QUIESCENT VEHICLE

(75) Inventor: Christopher L. Oesterling, Troy, MI (US)

(73) Assignee: General Motors Corporation, Detroit, MI (US)

( * ) Notice: Subject to any disclaimer, the term of this patent is extended or adjusted under 35 U.S.C. 154(b) by 602 days.

(21) Appl. No.: 10/115,321

(22) Filed: Apr. 3, 2002

(65) Prior Publication Data

US 2004/0203340 A1 Oct. 14, 2004

(51) Int. Cl.
*H04B 1/60* (2006.01)

(52) U.S. Cl. ........................ 455/9; 455/414.1; 455/557

(58) Field of Classification Search .................... 455/9, 455/436, 12.1, 426, 313, 318, 323, 11.1, 557, 455/418, 569.1, 423, 414.1; 701/36, 213, 701/211, 300; 342/357.07
See application file for complete search history.

(56) References Cited

U.S. PATENT DOCUMENTS

| | | | | |
|---|---|---|---|---|
| 5,635,923 | A * | 6/1997 | Steele et al. | 340/905 |
| 6,205,332 | B1 * | 3/2001 | Novel | 455/426.1 |
| 6,233,431 | B1 * | 5/2001 | Panther et al. | 340/7.28 |
| 6,298,306 | B1 * | 10/2001 | Suarez et al. | 701/213 |
| 6,566,958 | B1 * | 5/2003 | Smith | 330/296 |
| 2002/0049535 | A1 * | 4/2002 | Rigo et al. | 701/211 |
| 2002/0065037 | A1 * | 5/2002 | Messina et al. | 455/12.1 |
| 2002/0173889 | A1 * | 11/2002 | Odinak et al. | 701/36 |
| 2003/0143987 | A1 * | 7/2003 | Davis et al. | 455/417 |
| 2003/0186668 | A1 * | 10/2003 | Fitzrandolph | 455/313 |
| 2004/0023645 | A1 * | 2/2004 | Olsen et al. | 455/418 |
| 2004/0204069 | A1 * | 10/2004 | Cui et al. | 455/557 |

* cited by examiner

*Primary Examiner*—Matthew D. Anderson
*Assistant Examiner*—Tan Trinh
(74) *Attorney, Agent, or Firm*—Anthony Luke Simon

(57) ABSTRACT

The invention provides a method for establishing communications with a quiescent mobile vehicle. A satellite radio system broadcast channel is monitored for a command signal. The command signal is extracted from the broadcast channel. A cell phone in a telematics unit is powered up based on the command signal.

20 Claims, 2 Drawing Sheets

METHOD OF COMMUNICATING WITH A QUIESCENT VEHICLE

FIELD OF THE INVENTION

This invention relates generally to data transmissions over a wireless communication system. More specifically, the invention relates to a method and system for communicating with a powered-down mobile vehicle using a satellite radio broadcast system.

BACKGROUND OF THE INVENTION

Wireless communication services for mobile vehicles, such as navigation and roadside assistance, have increased rapidly in recent years. Most of the available services apply to a motor vehicle in operation, but more recently, the demands and potential for services to a turned-off vehicle have grown. Services that may be requested while the vehicle is off or in a quiescent mode may include maintenance and diagnostic functions, system updates, vehicle position determination, unlocking of the doors, or vehicle alarm setting and silencing.

Normally when the mobile vehicle equipped with a telematics unit or vehicle communication device is turned off, equipment may be placed into a powered-down or sleep mode. This sleep or discontinuous-receive (DRx) mode may include, for example, a time when the vehicle communication device is scheduled to awaken and the duration for the vehicle communication device to be awake. The discontinuous-receive mode may include storing information such as time and vehicle location at the initiation of the sleep mode. The discontinuous-receive mode may include setting a time for the next wakening period, and a duration for the next service-ready mode. The discontinuous-receive mode may also include actions to place other systems in the mobile vehicle into a quiescent or powered-down mode. The vehicle communication device may then power down. A telematics unit also may be powered down, for example. While powered down, the vehicle communication device may check an on-board clock or timer to determine when it is time to awaken.

A communication device and a telematics unit may be placed into a powered-down mode for minimal power drain on the battery. To perform a requested function while the ignition is off, the vehicle may be awakened, the desired function performed, and the vehicle placed back into the sleep mode.

One method currently in use is to synchronize the wake-up time with an incoming call from a telematics or service call center. When the vehicle is awakened, a call may be received and responded to appropriately. The time period between wake-up operations may vary from ten minutes, to several days or more if the vehicle has not been moved or driven for awhile. To coordinate the wake-up function with the call from the call center, time at the call center and at the mobile vehicle may need to be synchronized. A global positioning system (GPS) unit in the mobile vehicle may provide an accurate reading of time. After the call is received and the vehicle responds, the vehicle may be put back into the sleep mode again after a predetermined duration, minimizing battery drain.

Unfortunately, a prescribed wake-up schedule may not always accommodate the immediate needs of the user or service subscriber. A vehicle in long-term parking at an airport, for example, may have been powered down for a while, but may require immediate telematics assistance when the owner returns to a vehicle with keys locked inside. When a vehicle is stolen, for example, a vehicle owner may want to retrieve vehicle location information quickly.

A method with a quicker response time is needed to make vehicle services available when the vehicle is powered down or turned off. This would result in increased subscriber satisfaction with telematics services. Increased availability and timeliness of services may be compromised by the need to maintain low power consumption. The method would improve the availability of a vehicle to receive and perform a service request, while maintaining low power consumption.

It is an object of this invention, therefore, to provide a method for improving the availability of a quiescent vehicle to receive and perform a service request, and to overcome the deficiencies and obstacles described above.

SUMMARY OF THE INVENTION

One aspect of the invention provides a method for establishing communications with a quiescent mobile vehicle. A satellite radio system broadcast channel may be monitored for a command signal. The command signal may be extracted from the broadcast channel. A cell phone in a telematics unit may be powered up based on the command signal.

The command signal may include a telematics unit identifier, which may be a vehicle identification number, a mobile phone identification number, an electronic serial number, or a satellite radio receiver identification number.

The command signal may be transmitted from one of a geostationary satellite or a terrestrial radio transmitter of a satellite radio service. Command information may be uplinked from a satellite radio uplink facility to a geostationary satellite. Command information may be uplinked from a satellite radio uplink facility to a terrestrial radio transmitter. Command information may be sent from a call center to a satellite radio uplink facility in response to a service request.

The cell phone may be powered up for a predetermined time period before returning to a quiescent state. A call may be initiated from the cell phone to a call center in response to the command signal. The cell phone may operate in one of an analog mode or a digital mode.

Another aspect of the invention provides a computer usable medium that may include a program for establishing communications with a quiescent mobile vehicle. The computer program may include code to monitor a satellite radio system broadcast channel for a command signal. The program may include code to extract the command signal from the broadcast channel. The program may include code to power up a cell phone in a telematics unit based on the command signal.

The computer program may include code to uplink command information from a satellite radio uplink facility to a geostationary satellite. The program may include code to uplink command information from a satellite radio uplink facility to a terrestrial radio transmitter. The program may include code to send command information from a call center to a satellite radio uplink facility in response to a service request. The program may include code to initiate a call from the cell phone to a call center in response to the command signal.

Another aspect of the invention provides a system for establishing communications with a quiescent mobile vehicle, including means for monitoring a satellite radio system broadcast channel for a command signal; means for extracting the command signal from the broadcast channel; and means for powering up a cell phone in a telematics unit based on the command signal. The system may include means for uplinking command information from a satellite radio uplink facility to a geostationary satellite. The system may include means for uplinking command information from a satellite radio uplink facility to a terrestrial radio transmitter. The system may include a means for sending command information from a call center to a satellite radio uplink facility in response to a service request. The system may include means for initiating a call from the cell phone to a call center in response to the command signal.

The aforementioned, and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

A method for achieving faster response time for vehicle services when the vehicle is powered down or turned off may use broadcast services available with a satellite radio system. The method may be available to mobile vehicles that are equipped with satellite radio receivers. Broadcasted information on a specified channel of the satellite radio system may be monitored for vehicle-specific messages, and communications may be established with existing wireless systems to improve the availability of a vehicle to receive and perform a service request, while maintaining low overall power consumption.

Figure 1:
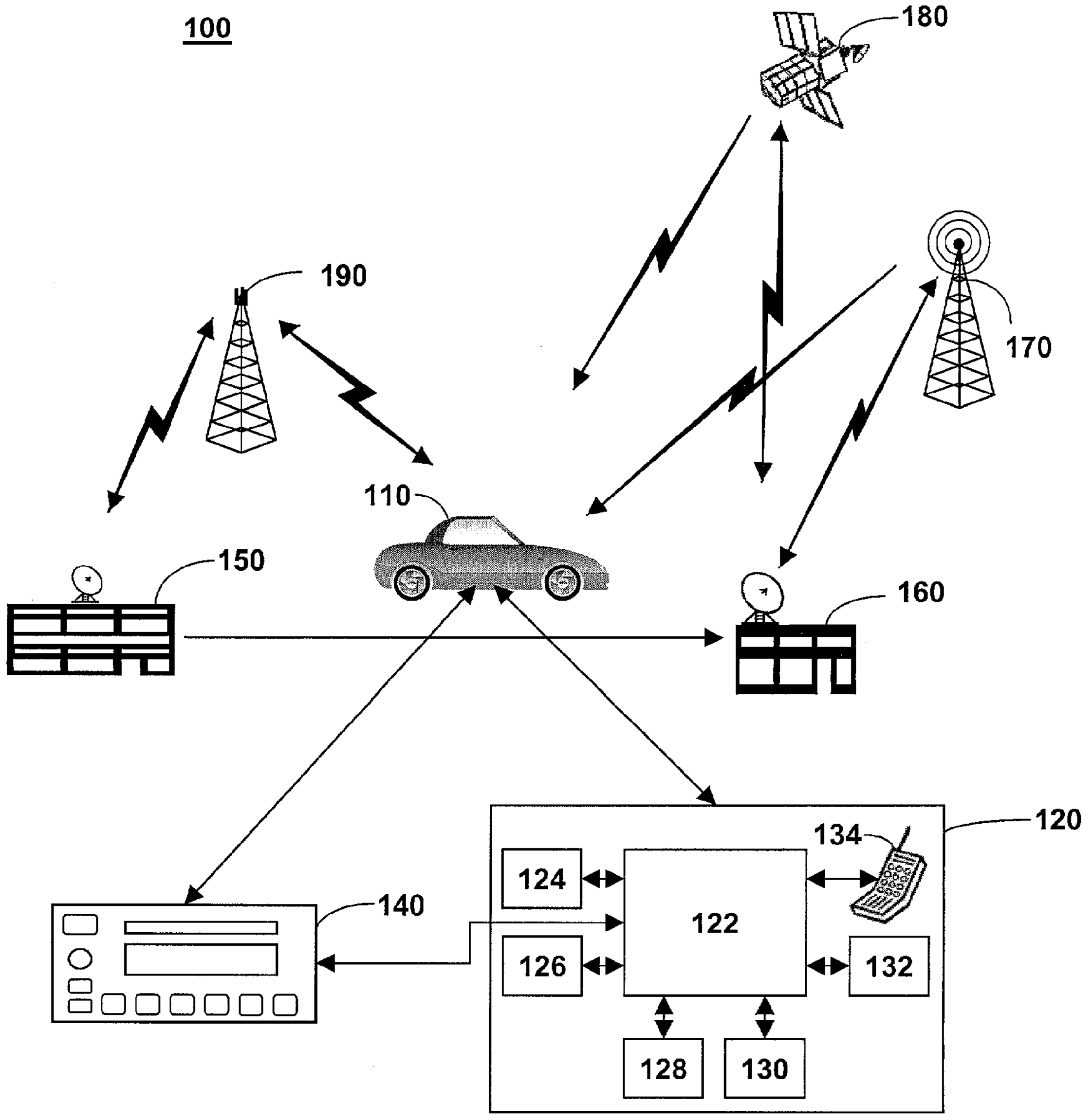
FIG. 1 is an illustration of one embodiment of a system for accessing a quiescent mobile vehicle equipped with a telematics unit and a satellite radio, in accordance with the current invention.

FIG. 1 illustrates one embodiment of a system for accessing a quiescent mobile vehicle equipped with a telematics unit and a satellite radio receiver, in accordance with the present invention at 100. The invention leverages the infrastructure of a satellite radio system to communicate with a telematics unit of a mobile vehicle, requesting the in-vehicle phone to call a telematics service call center or to perform another function. A satellite radio in a quiescent mobile vehicle may monitor a broadcast channel and receive a broadcasted message requesting an in-vehicle phone to call a telematics call center. The telematics unit may be awakened from a powered-down state so that it may call a telematics call center, establish bi-directional communications, and perform a requested telematics service.

Mobile vehicle access system 100 may include a mobile vehicle 110, a telematics unit 120, a satellite radio receiver 140, one or more telematics service call centers 150, one or more satellite radio service uplink facilities 160, one or more terrestrial radio transmitters 170, one or more satellite radio service geostationary satellites 180, a cellular phone network, and a wireless carrier system 190.

Mobile vehicle 110 may be a vehicle equipped with suitable hardware and software for transmitting and receiving voice and data communications. Mobile vehicle 110 may contain telematics unit 120. Telematics unit 120 may include a digital signal processor (DSP) 122 connected to a wireless analog, digital or dual-mode modem 124, a global positioning system (GPS) unit 126, an in-vehicle memory 128, a microphone 130, one or more speakers 132, and a network access device (NAD) or in-vehicle mobile phone 134. In-vehicle mobile phone 134 may be an analog, digital, or dual-mode cellular phone. GPS unit 126 may provide, for example, longitude and latitude coordinates of the vehicle. DSP 122 may use instructions and data from a computer usable medium that may contain various computer programs for controlling programming and operational modes within mobile vehicle 110. Digital signals may activate the programming mode and operation modes, as well as provide input and output data.

Satellite radio receiver 140 may be any suitable hardware for receiving satellite radio broadcast signals in mobile vehicle 110. Satellite radio receiver 140 may receive digital signals from a terrestrial radio transmitter 170 or a satellite radio service geostationary satellite 180. Satellite radio receiver 140 may include a radio receiver for receiving broadcast radio information over one or more channels. Satellite radio receiver 140 may generate audio output. Satellite radio receiver 140 may be embedded within telematics unit 120. Satellite radio receiver 140 may provide channel and signal information to telematics unit 120. Telematics unit 120 may monitor, filter and send signals that are received from satellite broadcasts, radio broadcasts or other wireless communication systems to output devices such as speaker 132 and visual display devices.

Telematics service call center 150 may be a location where many calls may be received and serviced at the same time, or where many calls may be sent at the same time. The call center may prescribe communications to and from mobile vehicle 110. Telematics service call center 150 may be a voice call center, providing verbal communications between an advisor in the call center and a subscriber in a mobile vehicle. Telematics service call center 150 may contain each of these functions. Telematics service call center 150 may contain one or more switches, one or more data transmission devices, one or more communication services managers, one or more communication services databases, one or more real or virtual advisors, and one or more bus systems.

When telematics service call center 150 receives a request from a telematics subscriber that requires communication with a powered-down or quiescent mobile vehicle, telematics service call center 150 may send command information to satellite radio uplink facility 160 that includes a request for telematics unit 120 to call the telematics service call center 150.

As part of a satellite broadcast system, a satellite radio uplink facility 160 may send and receive radio signals from a geostationary satellite 180. Satellite radio uplink facility 160 may uplink command information from telematics service call center 150 to one or more terrestrial radio transmitters 170. Satellite radio uplink facility 160 also may send the command and other radio signals to geostationary satellite 180.

Terrestrial radio transmitter 170 and geostationary satellite 180 may transmit radio signals to satellite radio receiver 140 in mobile vehicle 110. Terrestrial radio transmitter 170 and geostationary satellite 180 may broadcast, for example, over a spectrum in the “S” band (2.3 GHz) that has been allocated by the U.S. Federal Communications Commission (FCC) for nationwide broadcasting of satellite-based Digital Audio Radio Service (DARS). The broadcast may be, for example, a 120 kilobyte-per-second portion of the bandwidth designated for commands signals from telematics service call center 150 to mobile vehicle 110.

Broadcast transmissions provided by a satellite radio broadcast system may be sent from geostationary satellite 180 or terrestrial radio transmitter 170 to satellite radio receiver 140. In addition to music and entertainment, traffic information, road construction information, advertisements, news and information on local events, a command signal may be sent to satellite radio receiver 140 to awaken telematics unit 120 with a request for in-vehicle mobile phone 134 to call telematics service call center 150. Telematics unit 120 may monitor satellite radio system broadcast signals received by satellite radio receiver 140 for a command signal, and when a command signal is detected, the command signal and information may be extracted from the broadcast channel. Telematics unit 120 may store or retrieve data and information from the audio signals of satellite radio receiver 140.

The command signal may include a request for telematics unit 120 to call telematics service call center 150. In response, telematics unit 120 may place a call with in-vehicle mobile phone 134 via wireless carrier system 190.

Wireless carrier system 190 may be a wireless communications carrier. Wireless carrier system 190 may be, for example, a mobile telephone system. The mobile telephone system may be an analog mobile telephone system operating over a prescribed band nominally at 800 MHz. The mobile telephone system may be a digital mobile telephone system operating over a prescribed band nominally at 800 MHz, 900 MHz, 1900 MHz, or any suitable band capable of carrying mobile communications. Wireless carrier system 190 may transmit to and receive signals from mobile vehicle 110. Wireless carrier system 190 may be connected with other communication and landline networks. Telematics service call center 150 may be connected to wireless carrier system 190 with a land-based network, a wireless network, or a combination of landline and wireless networks.

Figure 2:
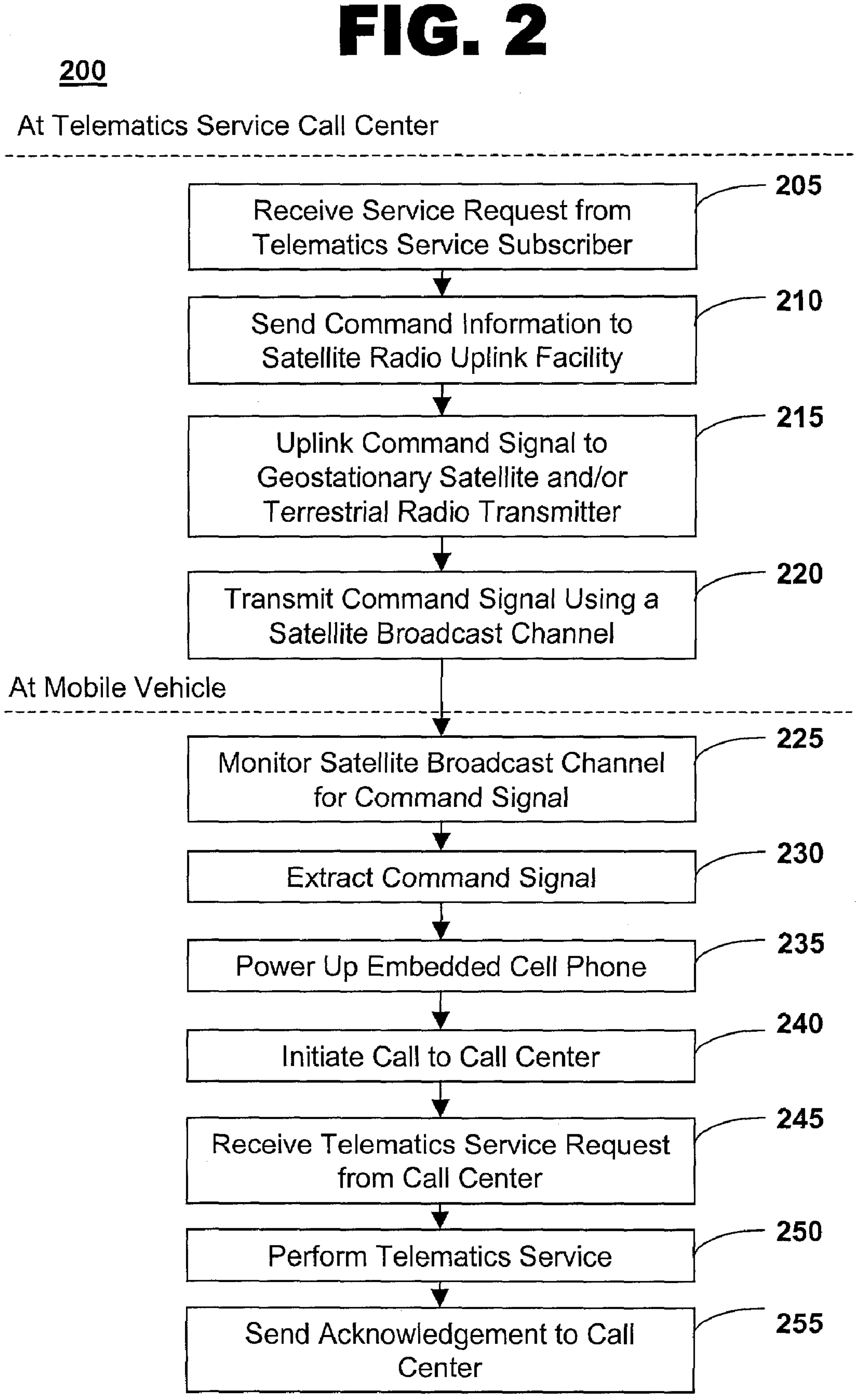
FIG. 2 is a flow diagram of one embodiment of a method for accessing a quiescent mobile vehicle equipped with a telematics unit and a satellite radio, in accordance with the current invention.

FIG. 2 shows one embodiment of a method for establishing communications with a quiescent mobile vehicle equipped with a telematics unit and a satellite radio receiver, in accordance with the present invention at 200. Quiescent mobile vehicle access method 200 comprises steps to send a command signal in a satellite radio broadcast, which contains information that may request that a particular in-vehicle mobile phone call a telematics service call center.

A telematics service call center may receive a service request from telematics service subscriber, as seen at block 205. A telematics service subscriber may request, for example, that the door of a vehicle be unlocked or that the vehicle's horn be honked and lights be flashed to help locate the vehicle in a large parking garage.

The telematics service call center may send command information to satellite radio uplink facility in response to the service request, as seen at block 210. The command information may be sent to the satellite radio uplink facility over landline or wireless links. The information may include a request for the telematics unit of the vehicle to call the call center along with a telematics unit identifier associated with the vehicle for which a service has been requested. The telematics unit identifier may be a vehicle identification number, a mobile phone identification number, an electronic serial number of the telematics unit, or a satellite radio receiver identification number associated with the satellite radio receiver.

The satellite radio uplink facility may uplink command information from a satellite radio uplink facility to a geostationary satellite, as seen at block 215. A computer application at a satellite radio uplink facility may control the sending of command signals that are received from telematics service call centers. The satellite radio uplink facility may also uplink command information to a terrestrial radio transmitter for local or metropolitan broadcasts, as seen at block 215. Satellite radio terrestrial radio transmitters may receive radio signals from a geostationary satellite, amplify the signals, and rebroadcast the signals.

The command signal may be transmitted in a satellite radio broadcast from one of a geostationary satellite and/or a terrestrial radio transmitter of a satellite radio service, as seen at block 220. The command signals may be transmitted using a predetermined broadcast channel. The command signal may be transmitted, for example, over a spectrum allocated for nationwide broadcasting of satellite-based Digital Audio Radio Service (DARS). Geostationary satellite may transmit radio signals with data to a satellite radio receiver in the mobile vehicle.

A satellite radio system broadcast channel may be monitored by a computer application in the digital signal processor (DSP) of the telematics unit for a command signal, as seen at block 225. The command signal for the designated vehicle may include a telematics unit identifier, identifying the vehicle for which a service has been requested. The command signal may be extracted from the broadcast channel, as seen at block 230. The broadcast channel may be monitored for particular command strings or protocol, and the command signal may be extracted for further processing when a particular telematics unit identifier is ascertained. The command signal may include a telematics unit identifier, which may be a vehicle identification number, a mobile phone identification number, an electronic serial number, or a satellite radio receiver identification number. The command signal may include a directive for the telematics unit to awaken from a sleep or discontinuous-receive (DRx) mode. The command signal may indicate to the telematics unit that the in-vehicle mobile phone should place a call to a predetermined telephone number of the telematics service call center.

The in-vehicle or embedded cell phone then may be powered-up based on the command signal, as seen at block 235. The telematics unit may initiate a call from the in-vehicle cell phone to a telematics service call center in response to the command signal, as seen at block 240. The cell phone may remain powered up for a predetermined time period before returning to a quiescent state to insure that the call center service request is completed and there are that no additional service requests. The cell phone may operate in one of an analog mode or a digital mode.

The telematics service call center may receive the call from the mobile phone in the mobile vehicle for which a telematics subscriber has requested service, and then the telematics service center may send back a service request. The telematics unit may receive the telematics service request from the telematics service call center, as seen at block 245, after which the digital signal processor in the telematics unit may initiate or control the response to the telematics service request in the mobile vehicle, as seen at block 250. The telematics service may include, for example, unlocking doors, honking a horn, reading the GPS location of the vehicle, or flashing the headlights. The service may be needed, for example, when an owner needs to locate the vehicle in a large parking garage and the honking of the car and the flashing of the headlights may help identify the location of the car. The telematics service may be, for example, to send the current GPS location of a stolen vehicle, which may help law enforcement authorities in retrieving the vehicle. After the telematics service has been completed, the telematics unit may optionally send to the call center an acknowledgement of receiving the request and of completing the service, as seen at block 255. The cell phone may remain powered up for a predetermined time period to insure that the call center has no additional requests for the mobile vehicle before returning to a quiescent state.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method for establishing communications with a quiescent mobile vehicle, comprising:
- monitoring a satellite radio system broadcast channel for a command signal;
- extracting the command signal from the broadcast channel; and
- powering up a cell phone in a telematics unit based on the command signal.

2. The method of claim 1 wherein the command signal includes a telematics unit identifier.

3. The method of claim 2 wherein the telematics unit identifier is selected from a group consisting of a vehicle identification number, a mobile phone identification number, an electronic serial number, and a satellite radio receiver identification number.

4. The method of claim 1 wherein the command signal is transmitted from one of a geostationary satellite or a terrestrial radio transmitter of a satellite radio service.

5. The method of claim 1 further comprising:
- uplinking command information from a satellite radio uplink facility to a geostationary satellite.

6. The method of claim 1 further comprising:
- uplinking command information from a satellite radio uplink facility to a terrestrial radio transmitter.

7. The method of claim 1 further comprising:
- sending command information from a call center to a satellite radio uplink facility in response to a service request.

8. The method of claim 1 wherein the cell phone is powered up for a predetermined time period before returning to a quiescent state.

9. The method of claim 1 further comprising:
- initiating a call from the cell phone to a call center in response to the command signal.

10. The method of claim 1 wherein the cell phone operates in one of an analog made or a digital mode.

11. A computer usable medium including a program for establishing communications with a quiescent mobile vehicle, comprising:
- computer program code to monitor a satellite radio system broadcast channel for a command signal;
- computer program code to extract the command signal from the broadcast channel; and
- computer program code to power up a cell phone in a telematics unit based on the command signal.

12. The computer usable medium of claim 11 further comprising:
- computer program code to uplink command information from a satellite radio uplink facility to a geostationary satellite.

13. The computer usable medium of claim 11 further comprising:
- computer program code to uplink command information from a satellite radio uplink facility to a terrestrial radio transmitter.

14. The computer usable medium of claim 11 further comprising:
- computer program code to send command information from a call center to a satellite radio uplink facility in response to a service request.

15. The computer usable medium of claim 11 further comprising:
- computer program code to initiate a call from the cell phone to a call center in response to the command signal.

16. A system for establishing communication with a quiescent mobile vehicle, comprising:
- means for monitoring a satellite radio system broadcast channel for a command signal;
- means for extracting the command signal from the broadcast channel; and
- means for powering up a cell phone in telematics unit based on the command signal.

17. The system of claim 16 further comprising:
- means for uplinking command information from a satellite radio uplink facility to a geostationary satellite.

18. The system of claim 16 further comprising:
- means for uplinking command information from a satellite radio uplink facility to a terrestrial radio transmitter.

19. The system of claim 16 further comprising:
- means for sending command information from a call center to a satellite radio uplink facility in response to a service request.

20. The system of claim 16 further comprising:
- means for initiating a call from the cell phone to a call center in response to the command signal.

* * * * *